United States Patent
Schreiber (12) 
(10) Patent No.: US 10,008,022 B2
(45) Date of Patent: Jun. 26, 2018

(54) METHOD FOR REPRESENTING AN ANIMATED OBJECT

(75) Inventor: Sven Schreiber, Potsdam (DE)

(73) Assignee: Progressive3D GmbH, Potsdam (DE)

(*) Notice: Subject to any disclaimer, the term of this patent is extended or adjusted under 35 U.S.C. 154(b) by 422 days.

(21) Appl. No.: 13/265,071

(22) PCT Filed: Mar. 26, 2010

(86) PCT No.: PCT/DE2010/000391
§ 371 (c)(1),
(2), (4) Date: Nov. 30, 2011

(87) PCT Pub. No.: WO2010/118729
PCT Pub. Date: Oct. 21, 2010

(65) Prior Publication Data
US 2012/0086718 A1    Apr. 12, 2012

(30) Foreign Application Priority Data
Apr. 18, 2009 (DE) .................. 10 2009 018 165

(51) Int. Cl.
*G06T 13/00* (2011.01)
*G06T 13/20* (2011.01)
(Continued)

(52) U.S. Cl.
CPC ............ *G06T 15/04* (2013.01); *G06T 11/001* (2013.01); *G06T 13/00* (2013.01); *G06T 13/20* (2013.01); *G06T 15/00* (2013.01); *G06T 19/00* (2013.01)

(58) Field of Classification Search
CPC ....... G06T 13/20; G06T 13/00; G06T 11/001; G06T 19/00; G06T 15/00; G06T 15/10; G06T 15/04
(Continued)

(56) References Cited

U.S. PATENT DOCUMENTS 5,630,043 A    5/1997   Uhlin
6,049,339 A    4/2000   Schiller et al.
(Continued)

FOREIGN PATENT DOCUMENTS

DE    698 31 385 T2    6/2006
DE    602 14 696 T2    9/2007

OTHER PUBLICATIONS

Thürey et al., Animation of Open Water Phenomena with coupled Shallow Water and Free Surface Simulations, Sep. 2-4, 2006, Proceedings of the 2006 ACM SIGGRAPH/Eurographics symposium on Computer animation.*
(Continued)

*Primary Examiner* — Matthew Salvucci
(74) *Attorney, Agent, or Firm* — Laurence A. Greenberg; Werner H. Stemer; Ralph E. Locher (57) ABSTRACT

The invention relates to a method for representing an animated object. In a three-dimensional drawing program used to generate and animate objects, the model behavior of objects is calculated. For this purpose, sequences of individual objects are output at defined times and subsequently the sequence of the individual objects is jointed into an animation sequence. Surface changes of the object are simulated by way of additional texture animation and output. The animation sequence and the texture animation are then joined in a vector-based page description language, such as the 3D PDF program, and played at the same time. Based on the available sequence of the individual objects, a user can interactively modify the object animated in this way while playing back the animation sequence and the texture animation and change the viewing angle for the animated object. The animation sequence or the texture animation can likewise be configured as an infinite loop and thereby give the human user a dynamic view of the animated object.

17 Claims, 4 Drawing Sheets

(51) Int. Cl.
*G06T 15/00* (2011.01)
*G06T 15/04* (2011.01)
*G06T 11/00* (2006.01)
*G06T 19/00* (2011.01)

(58) Field of Classification Search
USPC .................. 345/420–421, 473, 581–585
See application file for complete search history.

(56) References Cited

U.S. PATENT DOCUMENTS

| | | | | |
|---|---|---|---|---|
| 7,123,263 | B2* | 10/2006 | Harvill | 345/473 |
| 7,123,269 | B1 | 10/2006 | Bourdey et al. | |
| 8,199,152 | B2* | 6/2012 | Sullivan | G06T 7/0028 |
| | | | | 345/420 |
| 2008/0303826 | A1 | 12/2008 | Schiff | |
| 2009/0033674 | A1* | 2/2009 | Murrah et al. | 345/584 |
| 2009/0179901 | A1* | 7/2009 | Girard | 345/474 |
| 2010/0045670 | A1* | 2/2010 | O'Brien et al. | 345/420 |

OTHER PUBLICATIONS

Vogel, A., "Adobe Acrobat 3D Version 8—3D Konstruktionen sicher austauschen and abstimmen", May 31, 2007, URL: http://www.video2brain.com/de/products-136.htm.

Eyman, J., "Rediscovering Fire: A survey of Current Fire Models and Applications to 3D Studio Max", Independent study, 2003-2004, pp. 1-8, URL: http://www.cs.umd.edu/~mount/Indep/Yulia/fire.html.

Curington, I., "PDF3D Scientific Visualization with Interactive PDF Documents", Dec. 23, 2007, pp. 1-21, URL: http://www.pdf3d.com/news/PDF3D-SciViz-Manchester_13dec07.pdf.

Anonymous, "Animierte Textur", May 26, 2008, pp. 1-3, URL: http://wiki.delphigl.com/index.php/Animierte_Textur.

Anonymous, "The 3D Animation Process at Framework Media", 2005, pp. 1-7, URL: http://www.frameworkmedia.com/pdfs/animation_process.pdf.

International Search Report of PCT/DE2010/000391, dated May 10, 2011.

* cited by examiner

METHOD FOR REPRESENTING AN ANIMATED OBJECT

BACKGROUND OF THE INVENTION

Field of the Invention

The invention relates to a method for representing an animated object.

The representation of graphical objects is one of the main uses of computers with sometimes very large computer resources. Comprehensive computation operations are required, in particular, when simulating and representing three-dimensional objects, for example during the computer-aided design (CAD) of objects and the subsequent simulation of a particular object behavior. The object is conventionally created in a corresponding drawing program, for example a CAD program, and the object behavior is then simulated with respect to defined parameter properties. The simulation calculations may sometimes last for hours or even days on account of the comprehensive computation operations. The object which has been calculated in this manner can then be visualized in the drawing program, but any change in the view or parameters makes it necessary to recalculate the simulation of the object within the drawing program.

For example, DE 602 14 696 T2 thus describes the simulation of a flow of fluids and a structural analysis in thin-walled three-dimensional geometries, the simulation being input as an outer skin with a finite element mesh.

Furthermore, DE 698 31 385 T2 describes a method and an arrangement for blending graphical objects using planar maps which are described in a page description language. For this purpose, sections of a page description language representation are converted into a planar map representation and are blended with the planar map representations of the graphical objects.

The advantage is that planar maps allow a type of representation which is independent of the color space and the resolution.

U.S. Pat. No. 7,123,269 B1 likewise describes the modification of vector objects. After the user has selected particular sections of an image with a large number of vector objects, parameters of selectively determined vector objects can be changed and the changed vector objects can be represented again.

The laid-open specification US 2008/0303826 A1 discloses a method and a system for the animated representation of objects corresponding to data items by means of an intuitive input language.

The problem with all solutions in the prior art is that an animated object can only ever be represented in the drawing program. Alternatively, an image sequence of the animated object can be exported by the drawing program, in which case the image sequence and particular parameters of the image sequence, for example the viewing angle, cannot be subsequently changed.

For example, the so-called 3D-PDF from Adobe Systems Incorporated contains, as standard, rudimentary animation functions which can be used to animate bodies in the form of puppets. However, surface changes of the bodies cannot be changed, for example deformed, expanded or produced as a wave movement on the body, with the aid of the animation functions. In particular, it is currently not possible to interactively represent the disintegration of the body on account of external forces, for example as melting or exploding, in the 3D-PDF format. Therefore, it is currently not possible to run a precalculated animation and to interactively change the latter by superimposing object sequences and textures or to interactively change the viewing angle of the animated object during animation.

BRIEF SUMMARY OF THE INVENTION

The invention is based on the object of providing a fast and resource-saving method for representing an animated object, in which case the representation of the animated object can be interactively changed by a user.

The object is achieved by means of a method having the features according to claim 1. The invention provides a method for representing an animated object in the form of an animation sequence, in which a sequence of individual objects is generated for each moment of the animation sequence of the object. The individual objects fully depict the object at the respective moment and may be two-dimensional or three-dimensional representations of the object.

An object in the sense of the present invention is a two-dimensional or three-dimensional graphical representation of a real or a computer-generated item, for example a ship or a moving surface of the sea.

The individual objects are joined in succession for each moment and form the principal part of the animation sequence of the object. The surface changes of the object are then calculated as a texture animation. Texture animations are two-dimensional effects of the three-dimensional object which are projected onto the surface of the three-dimensional object in a similar manner to a video projector. Surface changes in the sense of the inventions may be, for example, deformations of the surface, material changes of the surface, liquid movements on or in the object or lighting effects. Lighting conditions can be changed by means of texture animation, as can color effects and two-dimensional movements, but not the shape and design of the three-dimensional object. The calculated surface changes as a texture animation are then projected onto the object in the animation sequence. The impression of an animated object is produced for a human viewer by simultaneously running the animation sequence as a sequence of the individual objects with the texture animation on the object.

The simulation of the object on the basis of internal or external forces is calculated using a three-dimensional animation program, for example "Blender" or "Lightwave3D". Alternatively, the animation program may also be integrated inside a program with a vector-based page description language. As part of the representation of the simulation, the object is represented in a simple manner and the sequence of the individual objects for defined moments is output. After the physical animations have been calculated in a protracted manner, an animation sequence which can be played as a sequence of the three-dimensional individual objects is obtained. Consequently, the viewing angle of the animated object can be interactively moved. A plurality of such precalculated animation and/or texture sequences can be freely assembled and can be combined with one another via a controller in such a manner that the visual impression of being able to change the physical properties of the animated object to a limited extent is produced for a human viewer.

25 objects are advantageously produced per second, which is advantageous on account of the physiognomy of the eye and makes it possible for the viewer to sense the running animation sequence with texture animation in a jerk-free manner. These individual objects which are calculated in a complicated manner are then played in succession at high speed. The principle corresponds to the presentation of film which likewise simulates a movement from a large number of still individual images by rapidly playing the latter.

A human viewer is provided with the impression of an animated object by integrating the texture animation as a simulated change of the surfaces of the object with the simultaneous running of the individual objects. This animation sequence of the animated object, which has been combined in this manner, requires less storage capacity on account of the reduced data density in comparison with playback in the drawing program. This makes it possible to interactively represent the animated object since the respective individual objects are present in full and the texture animations, for example in the form of a light or flow simulation, have likewise been determined on the basis of the animated object. Therefore, when interactively changing the viewing angle of the animated object, there is no need to determine a new animation sequence in the drawing program with sometimes a high degree of computational complexity, as previously.

One advantageous refinement of the method provides for the sequence of the individual objects to be created using a vector-based drawing program and to be assembled to form the animation sequence using a vector-based page description language. The individual objects are advantageously output via the conventional export and/or storage functions of the vector-based drawing program. Alternatively, provision is made for the individual objects to be filtered out from the vector-based drawing program and from the graphics memories used by the vector-based drawing program or to be recorded using grabbing software tools. In this case, the grabbing software tool may either be used autonomously or is part of the program written in a vector-based page description language.

In this case, the grabbing software tool may be part of the vector-based drawing program or may be a separate program, for example a so-called gadget as a software application. The grabbing software tool has direct access to the geometry memory, to the texture memory of the graphics card and/or to the graphics output, for example in the OpenGL or DirectX output format, in order to filter out the individual objects there.

This makes it possible, for example, to combine the simulation of a ship in conjunction with an animation of sea waves in such a manner that the ship is interactively viewed using a program written in a vector-based page description language. In one exemplary use of the method, a ship can be created as an object in the "Lightwave3D" program. The ship object is then illuminated and the resultant light simulation is stored in a graphics file, for example in the JPG format, with the result that the lighting moment can be recorded and can be projected, as a texture animation, onto the animated object in the form of a ship as part of the animation sequence. After the movement of the ship has been calculated as a movement of the object, the sea waves surrounding the object are stored as further objects with an additional texture animation. The resultant effects and interactions between the objects are simulated for each moment and are stored as respective individual objects in simple object models. In this respect, the individual object and optionally a possibly associated texture animation for the respective object are stored for each individual object of the object "ship" and for all individual objects of the objects "sea waves".

The individual objects and texture animations stored in this manner in respective files are now imported into a program with a vector-based page description language, for example the program "Acrobat 3D Toolkit" from Adobe Systems Incorporated. After the animated objects have been grouped with respect to one another and the texture animations have been projected onto the objects, the animation sequence can be visualized. The animated objects are combined as a sequence of the individual objects in the program with the vector-based page description language. Alternatively, the already existing sequence of the individual objects is imported into the program with the vector-based page description language.

The texture animation of the object is advantageously created using the vector-based drawing program and is combined with the object using the program with the vector-based page description language. This has the advantage that the sequence of the individual objects and the texture animation are directly joined with the aid of programs with a vector-based page description language and can be played in a manner virtually independent of the platform. Particularly programs with a vector-based page description language make it possible to represent the objects in a manner independent of the platform.

One advantageous refinement of the method provides for the texture animation of the object to be determined on the basis of a numerical simulation and to be combined with the object using the vector-based page description language.

The calculation and simulation of the object behavior as an animation sequence or of the texture of the object as a texture animation are carried out using corresponding basic equations, for example taking the lattice Boltzmann method as a basis for taking into account internal and external frictional forces for simulating liquid behavior. Liquids can thus be calculated in a physically correct manner in the sense of a simulation and allow the human viewer to be given a visual impression of the sequences connected with the animated objects and interactions between the objects. For example, the flow behavior of different liquids inside an object, for example inside a pipe, can be simulated.

The advantage is considered to be the fact that a further texture animation is created as a background plane of the object using the vector-based drawing program and is combined with the object as a background plane to form the animation sequence using the vector-based page description language. For this purpose, the background plane need not have any objects to be animated but rather the animated object with texture animation is projected against the background of an exclusive texture animation. This dispenses with computation operations since no individual objects have to be created and joined for the background plane.

As a result of the fact that the texture animation is generated independently of the individual objects or the objects, the texture animation can be interactively varied on the basis of predefinable boundary conditions and the respectively varied texture animation can be interactively projected onto the animated object using the vector-based page description language. Changes in the texture animation, for example lighting conditions or a changed material behavior, can thus be interactively changed by the user or on the basis of specifications and can then be projected onto the object to be animated. This makes it possible not only to interactively view the animated object from all sides in a program with a vector-based page description language but also to interactively change the texture animation in the program with the vector-based page description language at the same time.

A viewing angle of the animated object is advantageously interactively controlled using the vector-based page description language. Since the individual objects are in the form of two-dimensional or three-dimensional object bodies, the latter can also be viewed from all sides. Since the respective texture animations are likewise projected onto the respectively associated objects, the viewing angle can also be changed during the animation sequence of the animated object. This change in the viewing angle of the animation sequence of the animated object was not possible in previous object representations in vector-based page description languages. For this purpose, it is likewise important for a light texture to be calculated on the basis of the object and to be projected onto the object on the basis of the viewing angle.

So that the representation of the animation sequence of the animated object can also be played when there are few computer resources, the object is composed of polygons and/or triangles and/or non-uniform rational B-splines and/or voxels. Non-uniform rational B-splines (NURBS for short) are mathematically defined curves or areas which are used to model any desired shapes in the field of computer graphics. The geometrical information is represented using geometrical elements which are functionally defined piece by piece. Any desired technical producible or natural shape of an object or sections of an object can be represented with the aid of NURBS.

The advantage is considered to be the fact that a first sequence of individual images of the object for a first animation sequence is combined with a second sequence of individual images of the object for a second animation sequence. As a result of the fact that a plurality of animation sequences of the object are provided, the animation sequences can be played either at the same time or alternatively. Animation sequences can therefore be replaced with one another by the user during the playback operation. The user is therefore provided with extensive variation possibilities within the vector-based page description language in conjunction with the interactive control of the viewing angle.

First surface changes for the first sequence of individual images of the object are advantageously calculated as a first texture animation and second surface changes for the second sequence of individual images of the object are calculated as a second texture animation and are joined with the animation sequences using the vector-based page description language. This results in extensive possibilities for varying the texture animations with respect to the animated object within the vector-based page description language. In conjunction with the presence of alternative animation sequences as a sequence of individual objects which have been varied, extensive variations of the animated object, which either relate only to the surface of the animated object as a texture animation or even relate to the movement and the object per se as an animation sequence, can be carried out within the vector-based page description language.

Surface changes are respectively advantageously determined for a plurality of objects and/or the background plane and are joined using the vector-based page description language.

One advantageous refinement of the method provides for the first and last individual objects of the animation sequence to be matched to one another in such a manner that an endless loop of the animation sequence can be represented. The starting and end objects of the animation sequence are advantageously matched using a so-called loop editor. The endless loop can also be used with respect to selected individual objects in the central part of the animation sequence. The loop editor represents the calculated sequences of the individual objects in pictograms or as an object representation on a timeline—similar to a video editing program or a node editor which is known from 3D animation programs for the overview of the graphical programming of shaders, for example. This is because there is the possibility of copying, deleting and cutting sequences of the individual objects in this case too. An additional window in which the animation sequence of the object currently being animated runs is integrated in the loop editor. The first window shows, in animated form, the region which is currently being edited, and the second window shows the first individual object and the last individual object in an overlapping manner, the starting and end individual objects being displayed in a semi-transparent and overlapping manner. Optionally, the first ten individual objects and the last ten individual objects may also be represented in animated form in order to see where cutting is best. An additional function of the loop editor enables automatic approach between the start and end of the endless loop.

As a result of the fact that a virtually seamless transition between the starting individual object and the end individual object is defined, the animation sequence can be played in a virtually endless manner without the transitions from the end individual object to the starting individual object being apparent to the human viewer. One advantageous refinement of the method provides for corresponding boundary conditions and/or parameters to already be set when simulating and generating the sequence of the individual objects in such a manner that the end individual object of the animation sequence virtually corresponds to the starting individual object.

If a transition from the end individual object to the starting individual object of the animation sequence is not possible, the animation sequence is divided into partial sequences. For example, when simulating the flow of water through a curved pipe, the animation sequence can be such that the flowing of the water into the pipe is not repeated within an endless loop. The water begins to run and runs through the pipe until the desired end of the animation sequence. In the central part of the animation sequence, water has already reached the end of the pipe and flows through the pipes, with the result that there are presumably no longer any great changes in the flow properties and this central sequence can therefore be repeated. In an end sequence of the animation sequence, the switching-off of the water and the emptying of the pipe can then be represented as a sequence which cannot be repeated.

In the loop editor, the human viewer can define and configure the partial sequences of the animation sequence on the basis of his experience in such a manner that the partial sequences which are possibly configured in different ways form the animation sequence. The sequence of the individual objects which is defined in this manner can be played as desired within a program with a vector-based page description language, for example as 3D-PDF or alternatively also other playback environments such as the "Silverlight" program from the Microsoft Corporation or the "Flash" software tool from Adobe Systems Incorporated. In addition, the sequence of the individual objects can also be subsequently modified in the vector-based page description language. Further graphical optimizations, for example a polygon reduction, can likewise be carried out. The animation sequence created in this manner can then be read into a program with a vector-based page description language and can be used as a flash animation or in the form of a control file for an interactive three-dimensional object.

In addition to synchronizing the starting individual objects and the end individual objects in an animation sequence, the respective texture sequence can be synchronously played in an endless loop, the first and last individual objects of the animation sequence and the associated surface change as a texture of the first and last individual objects being virtually identical. This provides the human viewer with the greatest possible range of variation possibilities, with the result that, in addition to the possibility of selecting from a plurality of animation sequences, different texture animations for the respectively selected animation sequence can also be compiled by the human viewer in the vector-based page description language.

One advantageous refinement of the method provides for the sequence of the individual images and/or the texture animation and/or the light texture to be displayed in a display unit.

In order to reduce the computational complexity for simulating and determining the individual objects for the animation sequence, only sectional planes of the individual objects are determined on the basis of predefinable planes and are displayed on the basis of these planes. Even if the behavior of a three-dimensional object is intended to be simulated and animated, the animation sequence is composed only of sections or sectional planes of the individual objects. This minimizes the computational complexity and the data size of the animation sequence. Provision is made for different animation sequences to be created with respect to different sectional planes and sections. The respective sections or sectional planes of the individual objects can then be viewed by a human viewer in a quick and simple manner by interactively selecting the respectively desired animation sequence and thus the respectively desired sectional plane and it is possible to switch back and forth between the individual animation sequences by means of the vector-based page description language.

The sequence of the individual objects and/or the texture animation is/are determined using a simulation unit. By virtue of the fact that the sequence of the individual objects and/or the texture animation does/do not have to be calculated using expensive and complex simulation programs, it is possible to use a simulation unit tailored to the problem to be simulated. Simulation programs require comprehensive operation and control which can only be carried out by specially trained experts. In contrast, the simulation unit can be designed in such a manner that only a minimum amount of storage space is required and the input by a layman is also possible. For example, the parameter input carried out by the user can create a flow of water through a pipe, which, according to a simulation behavior, can meet a collision object (here the pipe), where the objects, in the form of water constituents, are then distributed according to the simulation. The real-time representation is effected using particle points or voxels for rapid understanding or on the basis of predefined sectional planes of the collision object. The collision object is precisely defined by locating the areas of polygons/triangles, that is to say by reading the boundaries of the collision object or by specifications from the user.

For this purpose, the user must open a toolbox and can then choose between different pipe cross sections, so-called "shapes". The user then specifies a radius for the diameter of the pipe as a collision object or interactively defines it using a graphical selection. The user then draws the line through the pipe as a collision object. Curve tools, distributing guides and other tools are available for creating the path. The user can selectively choose the shapes using the toolbox. Alternatively, this task can be transferred to a computer which selects the shapes in an automated method.

The real-time preview of the animation sequence is then represented in the path which has been created and the user can work with the parameterization. If the user is satisfied with the simulation, he can start the complex three-dimensional simulation by pressing a button and the animation sequence derived therefrom can be output. Optionally, the user can also generate texture animations which are subsequently projected onto the finished animation sequence.

The present method likewise makes it possible to import an area defined by the user, for example a water surface, into the simulation unit. The user can then input the necessary parameters, for example the wind direction and strength, and the simulation of a wave can thus be calculated. Additional objects such as ships can be placed on the water surface. The wave movements produce further waves and spray. The animation sequence indicates geometries and textures for the rough preview.

If the user is satisfied with the simulation, he can start the complex three-dimensional simulation by pressing a button and the finished animation sequence can be output. With this form of simulation, the closed water surface is broken up into sections; the spray first of all consists of particles, polygons or volume objects such as "voxels" and is subsequently likewise broken up into sections. The impinging drops of water of the spray and the breaking waves are stored as textures on the water surface. Both methods can be represented in real time separately or together using more modern and more powerful computers or may likewise be exported and/or processed as 3D object sequences.

Selected properties for the surface simulations of the water surface, such as color or transparency, can likewise be changed by the user. The wave movements of the water surface are created using so-called centers in which the waves arise. The method makes it possible for the wave to know its volume, force and speed in order to carry out correct force distributions at further objects, such as a wall or a ship, so that everything physically moves in a correct manner. Alternatively, a flash program can also be used to play the animation sequence.

The portable document format (PDF) data format is advantageously used as the vector-based page description language. However, other platforms such as Microsoft's "Silverlight", Adobe's "Flash" etc. can also be alternatively used. The advantage is considered to be the fact that the data size of the animation sequence is reduced to the image size of a display unit.

A computer program and a computer program product also achieve the object, the computer program product being stored in a computer-readable medium and comprising computer-readable means which cause a computer to carry out the method according to the invention when the program runs in the computer. The present invention may be implemented in the form of hardware, software or a combination of hardware and software. Any type of system or any other apparatus set up to carry out the method according to the invention is suitable for this purpose. The present invention may also be integrated in a computer program product which comprises all of the features that enable it to implement the computer-assisted methods described here and which, after being loaded into a computer system, is able to carry out these methods.

In the present context, the terms "computer program" and "computer program product" should be understood as meaning any expression in any desired computer language, code or notation of a set of instructions which enable a computer system to process data and thus to perform a particular function. The computer program or the computer program product can be executed on the computer system either directly or after conversion into another language, code or notation or by means of representation in another material form.

BRIEF DESCRIPTION OF THE SEVERAL VIEWS OF THE DRAWING

Further advantageous refinements are found in the subclaims. The present invention is explained in more detail using the exemplary embodiments in the figures, in which, by way of example.

DESCRIPTION OF THE INVENTION

Figure 1:
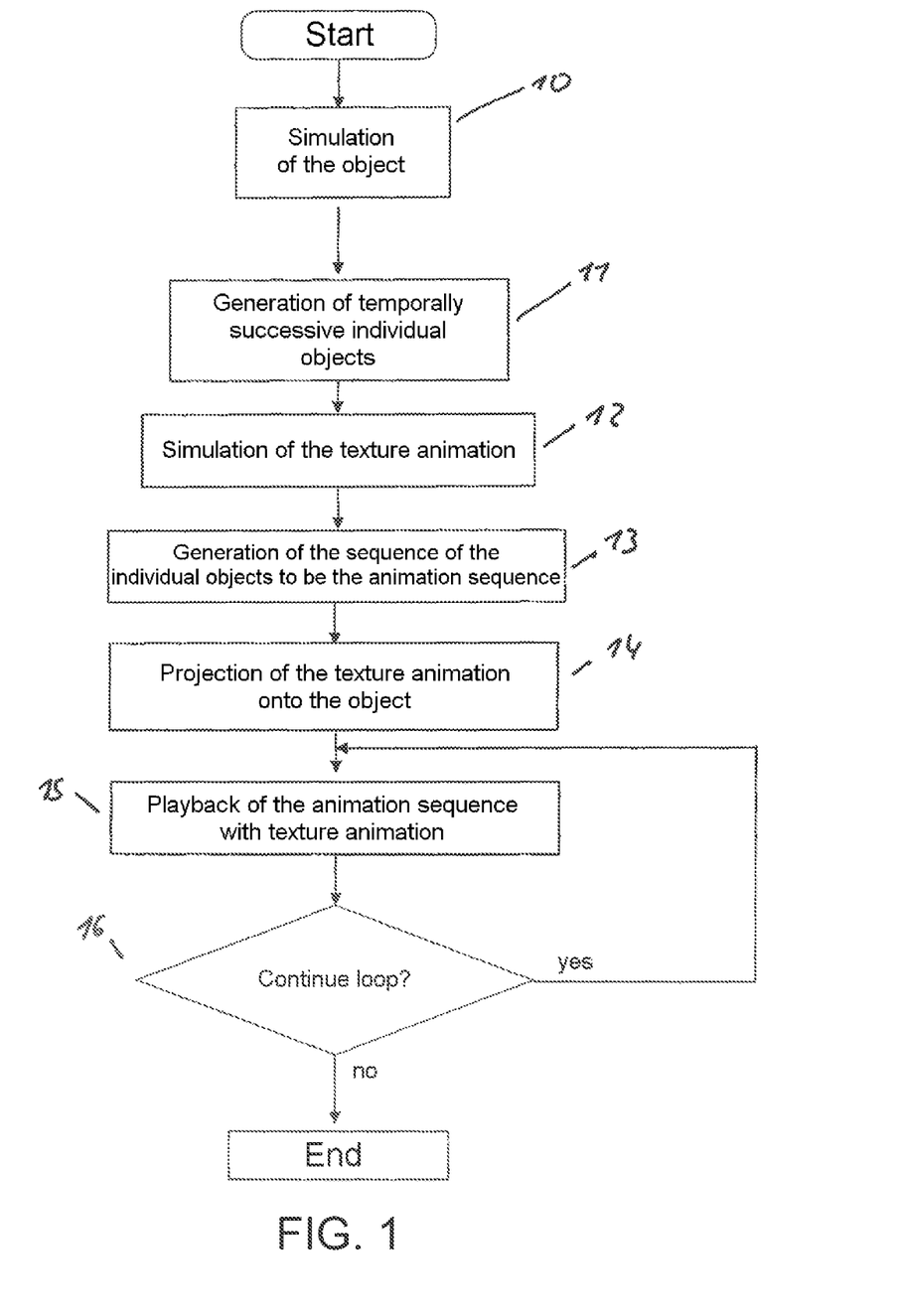
FIG. 1 shows a flowchart with the essential method steps.

FIG. 1 shows a flowchart with the essential method steps. After the method has been started, the object 1 (not illustrated) is simulated 10. In a drawing program 5 (not illustrated), for example Lightwave3D, or in a simulation unit, the behavior of the object 1 is simulated and is generated in temporally successive individual objects 2a, 2b, 2c, 2d, 2e, 2f, 2g (not illustrated).

In addition, the texture of the animated object 1 is generated and simulated 12 either in the drawing program 5 or by means of a separate editor 6 (not illustrated) and is stored as a texture animation 4a, 4b (not illustrated). Alternatively, the texture animation can also be simulated 12 in a parallel manner to the simulation of the object 10 or completely independently of the simulation of the object 10. The individual objects are then joined 13, as a temporal sequence, to form an animation sequence 3a, 3b (not illustrated). Alternatively, the individual objects 2a, 2b, 2c, 2d, 2e, 2f, 2g may also be individually read from the drawing program 5 and then viewed in a further preview program 17 (not illustrated) as a previewer and/or can be assembled as a sequence and thus as an animation sequence 3a, 3b. The texture animation 4a, 4b is then projected 14 onto the animation sequence 3a, 3b and thus depicts the surface changes of the animated object 1. The playback of the animation sequence 3a, 3b with the texture animation 4a, 4b is repeated using a loop operation 16 until an internal condition occurs or a human viewer terminates the process.

Figure 2:
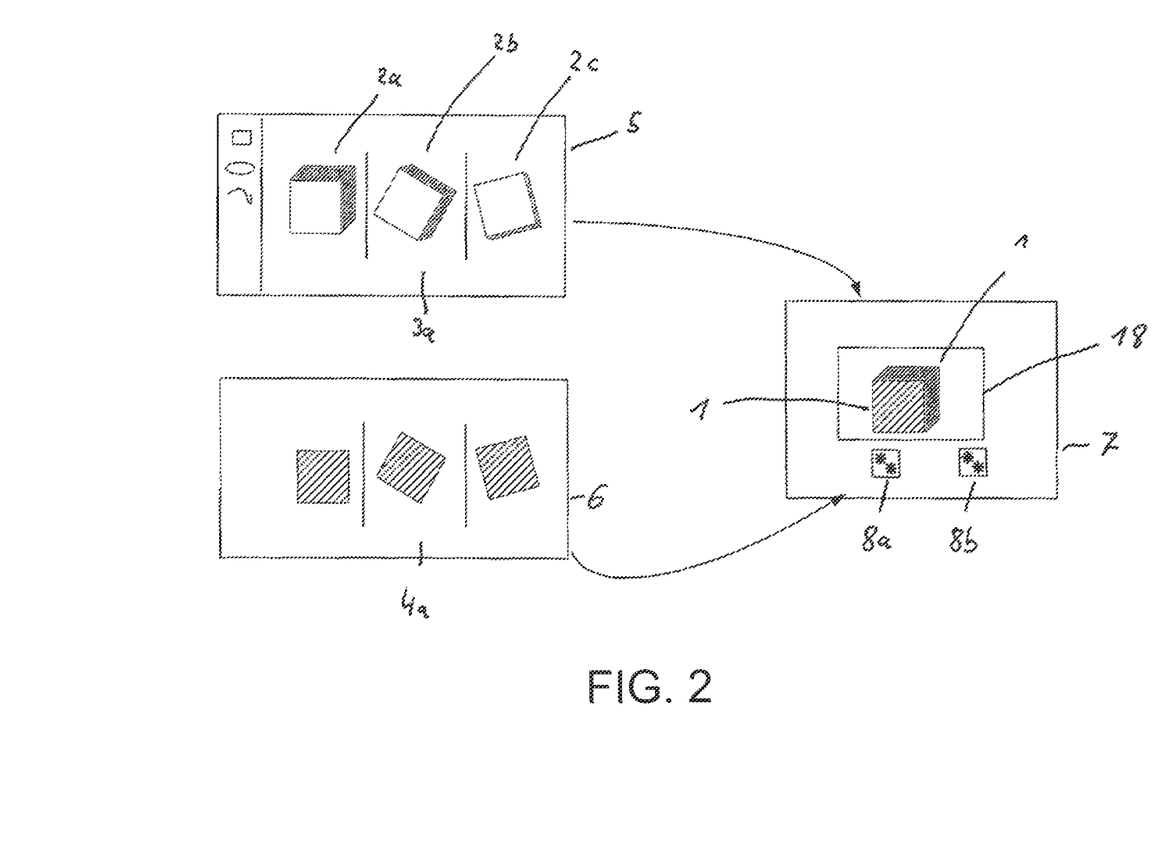
FIG. 2 shows a diagrammatic illustration of the essential method steps.

FIG. 2 illustrates a diagrammatic illustration of the basic method sequences. In the drawing program 5, the individual objects 2a, 2b, 2c are generated and the temporal behavior is simulated. In the drawing program 5, the individual objects 2a, 2b, 2c are already joined, as a sequence, to form an animation sequence 3a. The animation sequence 3a is indicated by the vertical lines between the individual objects 2a, 2b, 2c and is intended to indicate the temporal sequence of the individual objects 2a, 2b, 2c. In a further program 6, the textures are connected to form a texture animation 4a, the texture animation 4a again being indicated by the vertical lines between the textures. The animation sequence 3a and the texture animation 4a are loaded into a program with a vector-based page description language 7 and can be played in a display unit 18 by means of control elements 8a, 8b. The human user can use the control elements 8a, 8b to control the course and speed of the animation sequence 3a with the texture animation 4a.

Figure 3:
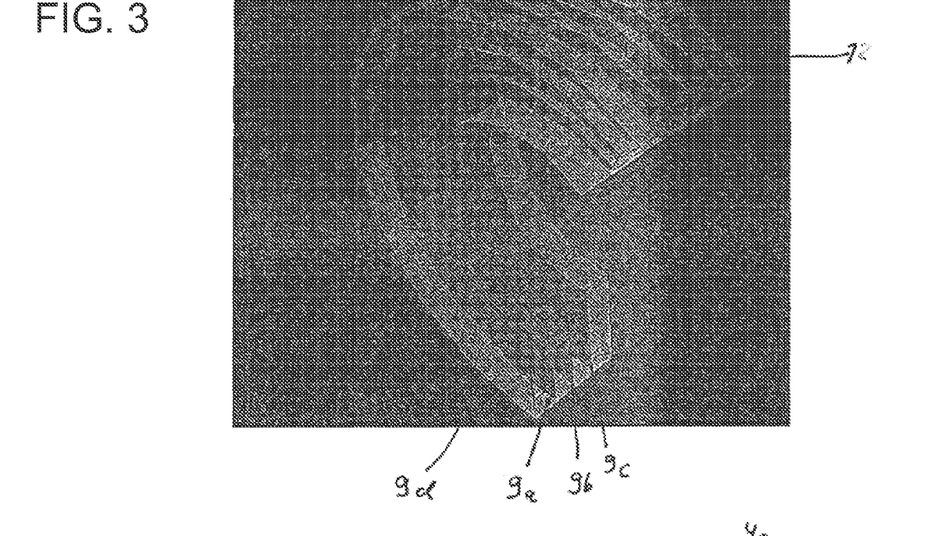
FIG. 3 shows a perspective view of an object with different sectional planes.

FIG. 3 shows a perspective view of an object 1 with different sectional planes 9a, 9b, 9c, 9d, in which case not all sectional planes illustrated are assigned to a figure designation for the sake of clarity. The animation sequence 3a, 3b (not illustrated) and the texture animation 4a, 4b, 4c (not illustrated) are calculated on the basis of a simulation for the entire object 1. However, the actual animations 3a, 3b, 4a, 4b, 4c are only illustrated and projected for predefinable sectional planes 9a, 9b, 9c, 9d, 9f, 9g. In the example shown in FIG. 3, three radially running sectional planes 9a, 9b, 9c subdivide the interior of a tubular object 1. Furthermore, three axially running sectional planes 9d, 9f, 9g run inside the pipe as an object 1. The animation sequence 3a, 3b and the texture animation 4a, 4b, 4c are output only for the sectional planes 9a, 9b, 9c, 9d, 9f, 9g, which requires only small computation capacities.

The three-dimensional simulation behavior of the animated object 1 can be represented in two dimensions by representing a three-dimensional object behavior in the two-dimensional sectional planes 9a, 9b, 9c, 9d, 9f, 9g—if appropriate on the basis of automatic detection of the object geometries during the simulation 10. A path to which the 2D textures of the fluid simulation of the animation sequence 3a, 3b, which functions in real time, can be tied is automatically created during the simulation 10.

Overall, depending on the computer capacity, a plurality of such "2D slices" as sectional planes 9a, 9b, 9c, 9d, 9f, 9g are placed in the pipe as an object 1 and are horizontally and vertically interleaved. In the case of 3×3 sectional planes 9a, 9b, 9c, 9d, 9f, 9g, as in the example shown in FIG. 3, nine animation sequences 3a, 3b and/or texture animations 4a, 4b, 4c are thus created and therefore, in combination, provide a user with a very realistic three-dimensional impression of the behavior of the animated object.

Figure 4:
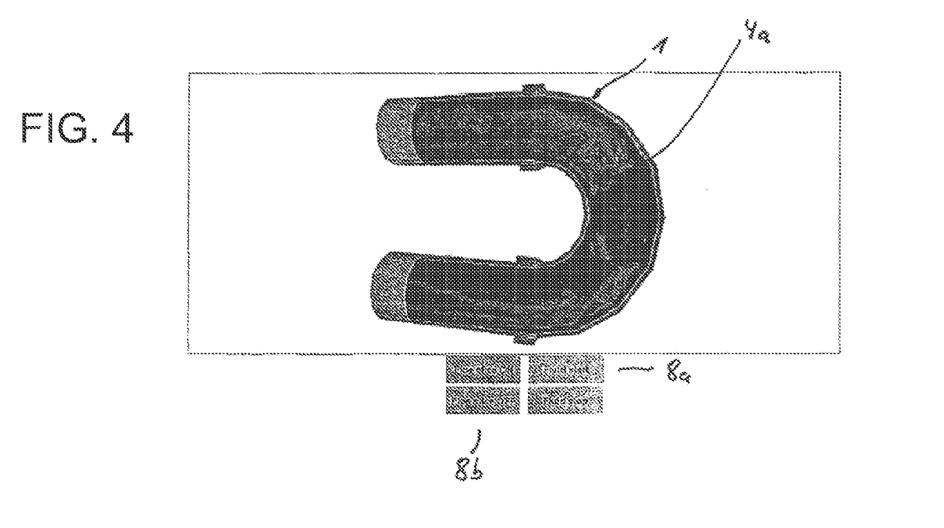
FIG. 4 shows a view of an object in a vector-based page description language program.

FIG. 4 shows an excerpt from an animation sequence 4a (not illustrated) of the animated object 1. In the example shown in FIG. 4, the object behavior of the static pipe does not need to be calculated. The medium flowing through the pipe is simulated using a simulation and is stored as individual objects 2a, 2b, 2c. The surface change of the liquid when flowing through the pipe is then simulated and stored as a texture animation 4a, 4b. In the program with the vector-based page description language, for example 3D-PDF or Microsoft's "Silverlight" or Adobe's "Flash", the animation sequence 3a, 3b and the texture animation 4a, 4b, 4c can then be joined and played. On account of the simple type of programming, it is also possible to define buttons and icons as control elements 8a, 8b in the vector-based page description language, which control elements make it possible to play the animation sequence 3a, 3b with the texture animation 4a, 4b, 4c. At the same time, the human viewer can use the control elements 8a, 8b to interactively change the viewing angle of the animated object 1.

Figure 5:
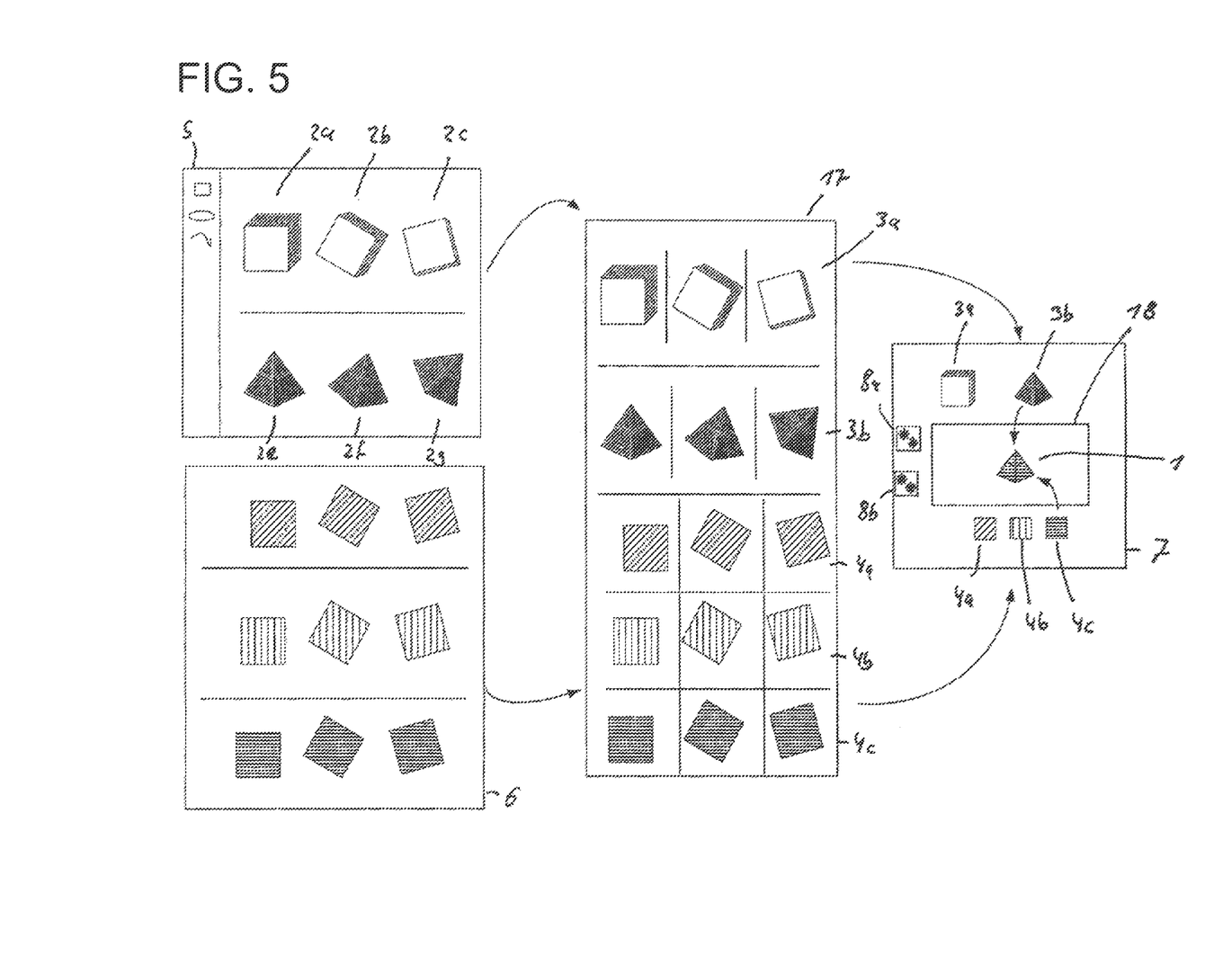
FIG. 5 shows a diagrammatic illustration of the essential method steps with a preview program.

FIG. 5 shows a diagrammatic illustration of the essential method sequences with a preview program 17. In the drawing program 5, the individual objects 2a, 2b, 2c, 2d, 2e, 2f, 2g are generated on the basis of a simulation predefined by the user. Corresponding textures with regard to the surface changes of the individual objects 2a, 2b, 2c, 2d, 2e, 2f, 2g are determined in the further program 6. The temporal sequence of the respectively associated individual objects 2a, 2b, 2c, 2d, 2e, 2f, 2g can be viewed in the preview program 17, a user then being able to generate an animation sequence 3a, 3b from this preview. The sequence of the textures can likewise be viewed and a texture animation 4a, 4b, 4c can then be created. The animation sequences 3a, 3b and the texture animations 4a, 4b, 4c are then loaded into the program with the vector-based page description language 7 and can be played in a display unit 18 using control elements 8a, 8b. In this case, during the running of a first animation sequence 3a, 3b with a first texture animation 4a, 4b, 4c, the user is likewise able to interactively mutually combine the animation sequence 3a, 3b and/or the texture animation 4a, 4b, 4c and to view it/them from different viewing angles. A simulation unit in which the individual objects 2a, 2b, 2c, 2d, 2e, 2f, 2g generated in the drawing program 5 and/or the textures generated in the further program 6 are simulated may likewise be integrated in the preview program 17.

In the program with the vector-based page description language 7, the user starts a program or a plug-in and imports the individual objects 2a, 2b, 2c, 2d, 2e, 2f, 2g using Adobe Acrobat 3D Toolkit or as an OBJ file or as further supporting file formats.

For example, in the case of simulation of the flow through a pipe according to the examples in FIG. 3 and FIG. 4, the user is then able to define the pipe as an object 1 and selects, for example, the radius of the pipe and the resolution of the further objects as volume bodies of the fluid. The user can then view a corresponding preview of the individual objects 2a, 2b, 2c, 2d, 2e, 2f, 2g and/or of the textures and the temporal sequence of the individual objects 2a, 2b, 2c, 2d, 2e, 2f, 2g and/or of the textures in the preview program 17 in a display unit. For this purpose, the model behavior of the individual objects 2a, 2b, 2c, 2d, 2e, 2f, 2g and/or of the textures is calculated for a plurality of sectional planes 9a, 9b, 9c, 9d, 9e, 9f and is represented in the three-dimensional pipe as an object 1 by means of a real-time preview.

Furthermore, the parameters and properties of the fluid can be interactively changed during the preview. There is also a standard setting which adopts materials such as water, oil or gases into the parameter setting at the click of a mouse. While the user is making his parameter input, he can see, in the preview program 5 in real time, how the settings directly change in the previewer. The user can likewise also set and interactively change the type of textures. When the user is satisfied with the setting, he presses a button "Create 3D sequence" and must also specify the formula according to which he would like to have the physical simulation calculated. All parameters are then adopted into the 3D engine and the animation sequence 3a, 3b either with or without a texture animation 4a, 4b, 4c is calculated 13, 14 from polygons, particles and/or volume models such as voxels. The animation sequences 3a, 3b and/or texture animations 4a, 4b, 4c calculated in this manner are stored. The animation sequences 3a, 3b and/or texture animations 4a, 4b, 4c are then edited in the loop editor in such a manner that a starting part, a central part and an end part of the animation sequences 3a, 3b and/or texture animations 4a, 4b, 4c are available and can be loaded into the 3D-PDF program or into other platforms such as Microsoft's "Silverlight" or Adobe's "Flash". If necessary, the central part of the animation sequences 3a, 3b and/or texture animations 4a, 4b, 4c can be run through again in certain loops. In order to reduce the file size of the animation sequences 3a, 3b and/or texture animations 4a, 4b, 4c, the user uses the function of the object detail reduction in the loop editor to reduce the resolution of the individual objects 2a, 2b, 2c, 2d, 2e, 2f, 2g and/or of the animation sequence 3a, 3b and/or of the texture animation 4a, 4b, 4c. Definitive animation sequences 3a, 3b and/or texture animations 4a, 4b, 4c are now automatically created using a control element 8a, 8b and are directly created in the program with the vector-based page description language, for example 3D-PDF.

The user can track his changes to the individual objects 2a, 2b, 2c, 2d, 2e, 2f, 2g and/or to the animation sequence 3a, 3b and/or to the texture animation 4a, 4b, 4c on the freely defined fluid flow or ocean current interactively and in real time. Although the technologies on the market, for example "Next Limits" or "RealFlow", make it possible for the user to parameterize the objects 1 as fluids, there is no real preview which allows the user to directly discern, with 25 images/second, what sort of effects the parameter changes have on the behavior of the individual objects 2a, 2b, 2c, 2d, 2e, 2f, 2g and/or of the animation sequence 3a, 3b and/or of the texture animation 4a, 4b, 4c. In such programs, there is a need for a time-consuming preview simulation which is then cached in order to show it to the user. If he changes the parameters, the entire simulation must be recalculated, sometimes with a considerable expenditure of time.

Provision is likewise made for the graphical data format, for example the OpenGL or the DirectX format, to be able to be used inside the drawing program 5 and/or the further program 6 and for the change in the surface colors to be able to be graphically represented in real time and thus observed by a viewer. These surface colors can be seen only when a button for the visibility of properties has previously been activated. If, for example, a ball as an animated object 1 is intended to be changed, the animation function changes the color of the selected ball as an animated object 1 to red. It is therefore possible to discern which objects 1 or object parts are currently running on the basis of the selection using the animation function. Blue could stand for water simulation with a large number of objects 1, green could stand for the masking of an object 1, pink stands for an object 1 which will collide, and pink-red stands for an object 1 which has its own deformation.

The present method also makes it possible to simulate film and gaming applications. The drawing program 5, 6 is used to create a percentage 3D map of hairs which are defined as objects 1. In order to be able to represent the hairs as objects 1 in real time, a multiplicity of sectional planes 9a, 9b, 9c, 9d, 9e, 9f are placed through the volume hair. The sectional planes 9a, 9b, 9c, 9d, 9e, 9f pierce the hairs to be modeled and leave behind a cross section of the hair which has just been cut on their 2D plane. This cross section is represented by the drawing program 5. Everything which has not been cut is transparent. Fanned out from the hairline to the tip of the hair, fifteen two-dimensional sectional planes 9a, 9b, 9c, 9d, 9e, 9f which are distributed along the hairs thus depict the hairs with the respective cross section of a hair and a texture.

There is also another variant for creating hairs in real time. For this purpose, in a base plate as an object 1 with small holes. This base plate as an object 1 moves very quickly from one point to the next. In this case, motion blur is switched on during the simulation 10. The holes in the base plate as an object 1 remain free because there can also be no motion blur where there is air. For this purpose, only every second individual object 2a, 2b, 2c, 2d, 2e, 2f, 2g is calculated so that it is not possible to discern any flowing movement from one point to the next. The impression that the motion blur "is stationary" and is not moving is thus produced. As a result of the effect, it appears as if grass is growing from the base plate as an object 1.

The invention claimed is:

1. A method for representing an animated three-dimensional vector-based object in the form of an animation sequence, having the following steps of:
generating a sequence of individual three-dimensional vector-based objects for each moment of the animation sequence of a three-dimensional vector-based object;
creating the sequence of the individual three-dimensional vector-based objects using a drawing program with a vector-based page description language;
joining the individual three-dimensional vector-based objects for each moment to form the animation sequence;
calculating surface changes of the three-dimensional vector-based object as a texture animation, wherein the surface changes include changes due to lighting conditions illuminating the three-dimensional vector-based object, and wherein the calculating is carried out by taking into account internal and external frictional forces of the object;
creating the texture animation of the three-dimensional vector-based object using the drawing program with the vector-based page description language;
assembling to form the animation sequence with the texture animation of the three-dimensional vector-based object using the drawing program with the vector-based page description language;
projecting the texture animation onto the three-dimensional vector-based object in the animation sequence;
combining the texture animation with the three-dimensional vector-based object using the drawing program with the vector-based page description language; and
simultaneously running the animation sequence with the texture animation and thus generating the impression of an animated three-dimensional vector-based object, wherein the animation sequence is calculated by an animation program;
wherein the portable document format (PDF) data format is used as the vector-based page description language.

2. The method as claimed in claim 1, wherein the texture animation of the three-dimensional vector-based object is determined on the basis of a numerical simulation and is combined with the three-dimensional vector-based object using the program with the vector-based page description language.

3. The method as claimed in claim 1, wherein a further texture animation is created as a background plane of the three-dimensional vector-based object using the drawing program with the vector-based page description language and is combined with the animation sequence as a background plane of the three-dimensional vector-based object using the program with the vector-based page description language.

4. The method as claimed in claim 1, wherein the texture animation is varied on the basis of the interactive variation of predefinable boundary conditions and the respectively varied texture animation is interactively projected onto the animated three-dimensional vector-based object using the program with the vector-based page description language.

5. The method as claimed in claim 1, wherein a viewing angle of the animated three-dimensional vector-based object is interactively controlled using the program with the vector-based page description language.

6. The method as claimed in claim 5, wherein a light texture is calculated on the basis of the three-dimensional vector-based object and is projected onto the three-dimensional vector-based object on the basis of the viewing angle.

7. The method as claimed in claim 1, wherein the three-dimensional vector-based object is composed of polygons and/or non-uniform rational B-splines and/or voxels.

8. The method as claimed in claim 1, wherein a first sequence of individual three-dimensional vector-based objects for a first animation sequence of the three-dimensional vector-based object is combined with a second sequence of individual objects for a second animation sequence of the three-dimensional vector-based object.

9. The method as claimed in claim 8, wherein first surface changes for the first sequence of individual three-dimensional vector-based objects are calculated as a first texture animation and second surface changes for the second sequence of individual three-dimensional vector-based objects are calculated as a second texture animation and are joined with the animation sequences of the three-dimensional vector-based object using the program with the vector-based page description language.

10. The method as claimed in claim 1, wherein surface changes are respectively determined for a plurality of three-dimensional vector-based objects and/or the background plane and are joined using the program with the vector-based page description language.

11. The method as claimed in claim 1, wherein the first and last individual three-dimensional vector-based objects of the animation sequence are matched to one another in such a manner that an endless loop of the animation sequence of the three-dimensional vector-based object can be represented.

12. The method as claimed in claim 11, wherein the animation sequence and the texture animation are synchronously played in an endless loop, the first and last individual three-dimensional vector-based objects of the animation sequence and the associated surface change as a texture animation of the first and last individual three-dimensional vector-based objects being virtually identical.

13. The method as claimed in claim 1, wherein the sequence of the individual three-dimensional vector-based objects and/or the texture animation and/or the light texture is/are displayed in a display unit.

14. The method as claimed in claim 1, wherein the individual three-dimensional vector-based objects are determined on the basis of predefinable planes and are displayed on the basis of these planes in the animation sequence of the three-dimensional vector-based object.

15. The method as claimed in claim 1, wherein the individual three-dimensional vector-based objects and/or the texture animation is/are determined using a simulation unit.

16. The method as claimed in claim 1, wherein the data size of the animation sequence of the three-dimensional vector-based object is reduced to the image size of a display unit.

17. The method as claimed in claim 1, wherein: the texture animation is a flow simulation of a flow medium; and the calculating is carried out taking into account internal and external frictional forces of the flow medium to simulate a behavior of the flow medium.

* * * * *